Oct. 24, 1944.  A. W. ANDERSON  2,360,837
WELDING DEVICE
Filed July 29, 1943
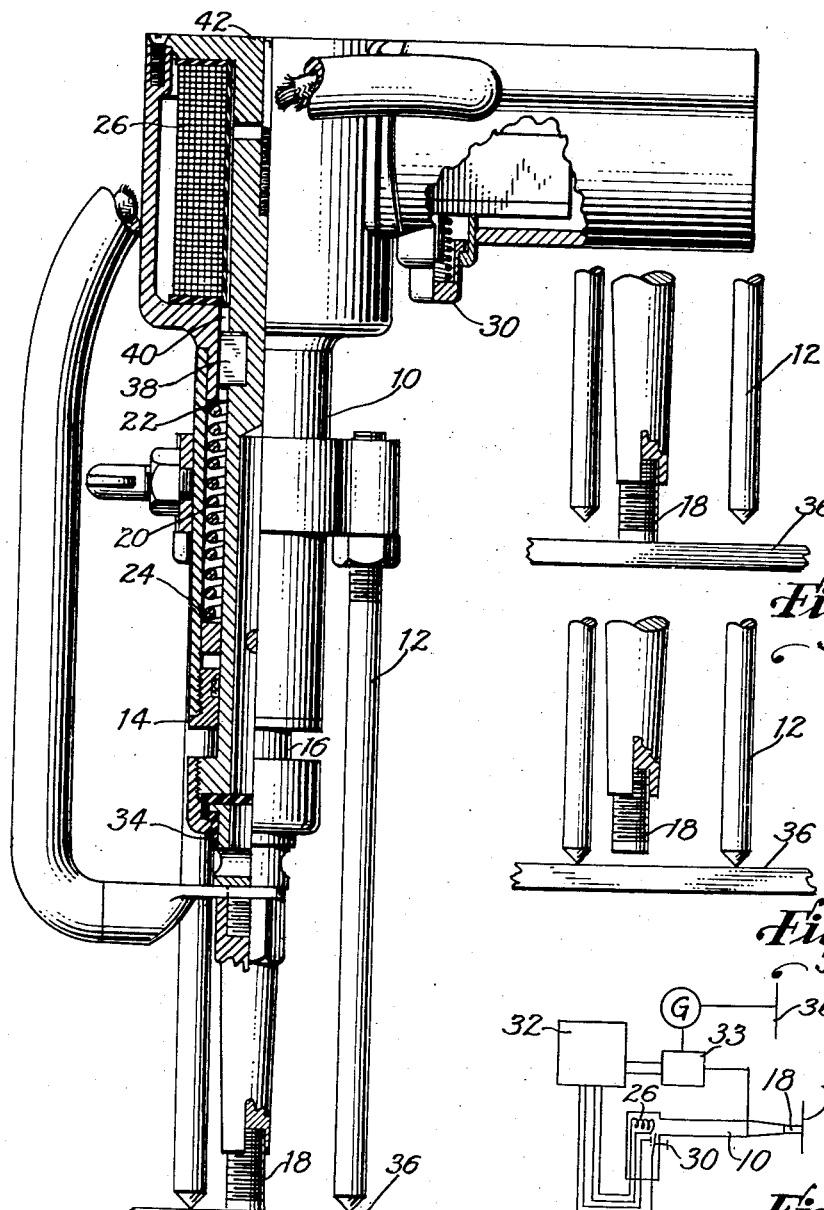
INVENTOR.
Andrew W. Anderson,
BY
Stone & Bush
ATTORNEYS.

UNITED STATES PATENT OFFICE 2,360,837

WELDING DEVICE

Andrew W. Anderson, Vallejo, Calif.

Application July 29, 1943, Serial No. 496,612

2 Claims. (Cl. 219—4)

(Granted under the act of March 3, 1883, as amended April 30, 1928; 370 O. G. 757)

This invention relates to a welding device, and more specifically, to a device for welding studs.

In general, it is an object of the invention to provide a device which is simple of construction, and is quickly and readily manufactured of common mechanical elements, which may be repaired without difficulty, and which may be used with ease and safety.

Another object is to provide a stud-welding device that requires but a single spring element, that includes no cocking in its operation, and that has a minimum of operating parts whereby original cost, chance of derangement, and cost of repair are held as low as possible.

Other objects of the invention will, in part, be obvious, and will, in part, appear hereinafter.

The invention accordingly comprises an article of manufacture possessing the features, properties and relation of elements that will be exemplified in the articles hereinafter described, the scope of the application of which will be indicated in the claims.

For a better understanding of the invention, reference should be had to the following description taken in connection with the drawing, in which Fig. 1 is a side view, with a portion in section, of a device embodying one form of the invention, the position of the parts being that just before the welding current is turned on;

Fig. 2 is a view of the feet of the device and the stud before the device is brought into contact with the work;

Fig. 3 is a view of the feet of the device and the stud after the device has been placed against the work and after the welding current has been turned on; and Fig. 4 is a diagram of electrical connections for the device of Fig. 1.

The present invention comprises a portable gun for welding a stud or other element against an object such as a steel plate. The plate is one electrode in an electric circuit; the stud is the other electrode. The gun presses the stud against the plate, establishing the electric circuit. The gun then retracts the stud a slight distance, whereby between the stud and the plate there is set up an arc which melts the end of the stud and the underlying point of the plate. Then the gun plunges the stud against the plate; at approximately the same time, the circuit is automatically broken, and the gun removed, leaving the stud welded to the plate.

In the drawing, 10 denotes a circularly cylindrical casing to which are attached one or more legs 12. Slidable through a bushing 14 at the forward end of the casing is a plunger 16 coaxial with the casing. The forward end of the plunger supports the unit 18 to be welded. The unit may be a stud and may be inserted into a cavity at the forward end of the plunger. A spring 20 within the casing encircles the plunger and presses at the back end against an abutment 22 of the casing and at the forward end against a collar 24 fixed to the plunger. A solenoid 26 in the casing surrounds a portion of the plunger.

The forward end of the plunger is connected to one side of a source of potential through contactor 33. The forward end of the plunger is electrically insulated from the other end of the plunger and the casing by insulation 34. The contactor 33 in the main welding circuit is controlled by control 32, which includes a timer. The closing of the push button contact 30 closes contactor 33 through control 32, and also sends current through the solenoid. After a predetermined time, the timer in the control opens the contactor in the main circuit and stops the current in the solenoid. The work 36 is connected to the other side of the potential source.

The collar 24 is so positioned on the plunger that when spring 20 has pushed the collar against the bushing 14, the forward end of the stud is forward of the forward end or ends of the one or more legs 12. This position, shown in Fig. 2, is the one assumed by the device before it is brought into contact with the work 36. A key 38 fixed to plunger 16 is slidable in a slot 40 in the casing.

Means are provided for assuring a predetermined length of arc. These may take the form of a rear stop 42. When the plunger is against the stop 42 the plunger is so placed that the tip of the stud is the predetermined distance behind the forward end of the leg 12, i. e., away from the work.

The operation of the device is as follows: One or more legs 12 are placed against the work 36. This pushes the stud 18 back until it and the end of the legs are all against the work. When the electric circuit is closed by contact button 30, the solenoid draws the plunger backward and further compresses the spring. The plunger, or material attached thereto, is magnetically inductive. The motion of the plunger separates the stud from the work and sets up an arc therebetween. The rearward movement of the plunger is stopped by the stop 42. The timer unit in the control 32 opens the contactor after a time predetermined to be sufficient properly to melt the stud and the work. At the same time, the solenoid ceases to function and the spring plunges the stud against the molten point of the plate. The weld hardens and the device is pulled away leaving the stud in place.

The unit to be welded may have a holding element such as a disk at its outer, nonwelding end. It may be used to quilt material against a lower layer to which the unit is welded.

The invention described herein may be manufactured and used by or for the Government of the United States of America for governmental purposes without the payment of any royalties thereon or therefor.

Having described my invention what I claim as new and desire to obtain by Letters Patent is:

1. A welding device comprising a leg element adapted to be positioned against the work, means for supporting a unit which is to be welded to the work, spring means for positioning the forward end of said unit farther forward than the forward end of said element, said spring means being adapted to yield until said end of said unit and said end of said element are in the same plane, said supporting means and said unit being movable with respect to the remainder of said device, electromagnetic means for retracting said supporting means until said end of said unit is farther back than said end of said leg element, said spring means being adapted to be progressively further compressed during the action of said retracting means and being free, at any time when said retracting means ceases to operate, to move said end of said unit against the work said supporting means extending into said electromagnetic means and said spring means being nearer said end of said leg element than is said electromagnetic means.

2. A welding device comprising a leg adapted to be positioned against the work, a plunger adapted to carry a unit to be welded to the work, and movable with respect to the remainder of said device, a spring for moving said plunger until the forward end of said unit is forward of the forward end of said leg, said spring being compressible for permitting said plunger to move back relatively to the remainder of said device when said remainder is moved toward the work until the forward end of said leg contacts the work and for pressing at that time, said end of said unit against the work, said spring being farther compressible, and an electromagnet for farther retracting said plunger against the action of said spring until said end of said unit is moved away from said work, said spring being free at any time, when said electromagnet ceases to act, to plunge said unit against the work said plunger extending into said electromagnet and said spring being nearer said end of said leg than is said electromagnet.

ANDREW W. ANDERSON.